United States Patent
Vahabzadeh (10) Patent No.: US 10,012,298 B2
(45) Date of Patent: Jul. 3, 2018

(54) TORQUE CONVERTER FOR MANUAL TRANSMISSION AND METHOD OF CONTROLLING THE SAME

(71) Applicant: AVL Powertrain Engineering, Inc., Plymouth, MI (US)

(72) Inventor: Hamid Vahabzadeh, Oakland, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 267 days.

(21) Appl. No.: 14/818,801

(22) Filed: Aug. 5, 2015

(65) Prior Publication Data
US 2016/0052518 A1    Feb. 25, 2016

Related U.S. Application Data (60) Provisional application No. 62/041,213, filed on Aug. 25, 2014.

(51) Int. Cl.
| | |
|---|---|
| F16H 47/06 | (2006.01) |
| F16H 45/02 | (2006.01) |
| F16H 3/00 | (2006.01) |
| B60W 10/10 | (2012.01) |
| B60W 30/18 | (2012.01) |
| B60W 10/02 | (2006.01) |
| F16H 41/24 | (2006.01) |

(52) U.S. Cl.
CPC ........... *F16H 47/06* (2013.01); *B60W 10/023* (2013.01); *B60W 10/026* (2013.01);
(Continued)

(58) Field of Classification Search
CPC .......... F16H 3/006; F16H 3/091; F16H 41/00; F16H 41/04; F16H 41/24; F16H 45/02;
(Continued)

(56) References Cited

U.S. PATENT DOCUMENTS

| | | | |
|---|---|---|---|
| 3,593,596 A | 7/1971 | Race et al. | |
| 3,691,861 A * | 9/1972 | Sturmer | F16H 3/006 74/330 |

(Continued)

FOREIGN PATENT DOCUMENTS

| | | | | |
|---|---|---|---|---|
| CN | 201385579 Y | 1/2010 | | |
| DE | 10314339 A1 * | 10/2004 | | F16H 59/38 |

*Primary Examiner* — William C Joyce
*Assistant Examiner* — Joseph H Brown
(74) *Attorney, Agent, or Firm* — Harness, Dickey & Pierce, P.L.C.

(57) ABSTRACT

A torque converter for coupling an engine to a manual transmission and a method of controlling the same are provided. The torque converter includes a housing rotating with the engine, a cover abutting the housing, a stator, a pump circulating fluid within the torque converter, and a turbine driven by the circulating fluid. An integrated disconnect clutch controls pump speed and a torsional damper attenuates vibrations transmitted through the housing. A first output shaft is coupled with the turbine and drives a first forward gear of the manual transmission while permitting slip. A second output shaft is coupled with the torsional damper, the integrated disconnect clutch, and the pump and drives at least one other forward gear of the manual transmission without slip. An output connection member rotatably couples the pump with the torsional damper, the integrated disconnect clutch, and the second output shaft.

19 Claims, 3 Drawing Sheets

(52) U.S. Cl.
CPC ...... *B60W 10/10* (2013.01); *B60W 30/18027* (2013.01); *F16H 3/006* (2013.01); *F16H 41/24* (2013.01); *F16H 45/02* (2013.01); *B60W 2710/024* (2013.01); *B60W 2710/1005* (2013.01); *F16H 2045/0221* (2013.01); *F16H 2200/0043* (2013.01)

(58) Field of Classification Search
CPC ............... F16H 47/06; F16H 2045/002; F16H 2045/0221; F16H 2200/0043; F16H 2045/0205–2045/0294; F16H 2045/005; F16H 2045/007; F16H 2041/243; F16H 45/00; F16H 47/00; F16H 2003/007
USPC ....... 74/655, 718, 730.1; 192/3.21; 416/180, 416/197 C
See application file for complete search history.

(56) References Cited

U.S. PATENT DOCUMENTS

| | | | |
|---|---|---|---|
| 4,246,997 A * | 1/1981 | Tarumizu | F16H 45/00 192/3.27 |
| 4,314,487 A | 2/1982 | Ahlen | |
| 4,583,426 A | 4/1986 | Chassagnette et al. | |
| 4,820,209 A * | 4/1989 | Newman | F16H 45/02 192/221 |
| 4,860,861 A | 8/1989 | Gooch et al. | |
| 5,038,627 A | 8/1991 | Schwaiger et al. | |
| 5,685,404 A | 11/1997 | Fukushima | |
| 5,954,607 A | 9/1999 | Nitsche et al. | |
| 5,992,589 A | 11/1999 | Fukushima | |
| 6,974,008 B2 * | 12/2005 | Leber | F16H 45/02 192/3.25 |
| 7,055,663 B2 * | 6/2006 | Leber | F16H 59/14 192/3.25 |
| 7,445,099 B2 * | 11/2008 | Maucher | F16H 45/02 192/3.26 |
| 9,157,492 B2 * | 10/2015 | Hemphill | F16H 45/02 |
| 2006/0185954 A1 * | 8/2006 | Rebholz | F16H 45/02 192/3.29 |
| 2007/0074943 A1 * | 4/2007 | Hemphill | F16H 45/02 192/3.25 |
| 2010/0084213 A1 | 4/2010 | Hoyle et al. | |
| 2011/0114433 A1 * | 5/2011 | Hattori | F16H 45/02 192/3.29 |
| 2013/0253783 A1 | 9/2013 | Gratton et al. | |
| 2015/0167840 A1 | 6/2015 | Mordukhovich | |
| 2015/0219195 A1 * | 8/2015 | Okaji | F16H 41/24 60/345 |

\* cited by examiner

TORQUE CONVERTER FOR MANUAL TRANSMISSION AND METHOD OF CONTROLLING THE SAME

CROSS-REFERENCE TO RELATED APPLICATIONS

This application claims the benefit of U.S. Provisional Application No. 62/041,213, filed on Aug. 25, 2014. The entire disclosure of the above application is incorporated herein by reference.

FIELD

The present disclosure relates to drivetrain components including manual transmissions and torque converters. More particularly, a torque converter assembly for coupling an engine to a manual transmission is disclosed along with a method of controlling the same.

BACKGROUND

This section provides background information related to the present disclosure which is not necessarily prior art.

Conventional manual transmissions generally have several basic components including a gear set, a clutch, and a gear change (i.e. a manual shift lever). As such, conventional manual transmissions are relatively simple in design, leading to cost savings, increased efficiency, and good reliability. To launch a vehicle and to change gears, the driver engages the clutch, selects a gear, and then releases the clutch while controlling clutch pressure and engine speed. Hence, the operation of conventional manual transmissions can demand considerable driver concentration and coordination. Such operations can also be difficult for inexperienced drivers to master and can cause driver fatigue. In city driving or when driving in heavy traffic, where speeds are low and travel is stop-and-go, conventional manual transmissions can be particularly undesirable because the driver must repetitively shift into and out of gear while balancing the application of the clutch to prevent the engine from stalling. Vehicles with conventional manual transmissions can also experience abrupt acceleration during gear changes, particularly where vehicle speed, engine speed, shift timing, and clutch pressure are not properly judged by the driver. This leads to an uncomfortable, jarring ride for the driver and passengers alike.

To ease driving effort and to increase comfort, automatic transmissions were developed. Automatic transmissions eliminate the need for the driver to manually change gears while operating the clutch and adjusting engine speed. Automatic transmissions also have other desirable characteristics including increased smoothness and decreased noise, vibration, and harshness. However, these benefits come with several drawbacks including increased complexity, increased cost, and decreased efficiency.

The centerpiece of conventional automatic transmissions is a torque converter. The torque converter includes a fluid coupling that transfers the rotational power produced by the engine to other drivetrain components. The key functions of the torque converter are to multiply the torque produced by the engine and to permit slip between the engine output and the other drivetrain components. These functions are interrelated and enable a vehicle to be launched from stop without a clutch and without stalling the engine. Torque converters generally include a housing that is connected to and rotates with an engine output shaft such as a crankshaft. Torque converters further include a cover that abuts the housing to form an internal cavity. A stator is disposed within the internal cavity that redirects fluid flow within the internal cavity to multiply engine torque. A pump is connected to the inside of the housing that circulates fluid within the internal cavity. A turbine is disposed within the internal cavity that is driven by the fluid circulating within the internal cavity. The turbine is then coupled to the other drivetrain components through the gears of the automatic transmission. Some conventional torque converters also feature a lock-up clutch disposed within the internal cavity. The lock-up clutch selectably applies pressure against the housing to rotatably couple the turbine with the housing.

In an effort to create new transmissions that combine the efficiency and cost benefits of the conventional manual transmission with the smoothness and refinement of conventional automatic transmissions, conventional torque converters have been mated with manual transmissions. One such design is disclosed in U.S. Provisional Patent Application Ser. No. 61/915,695 filed on Dec. 13, 2013 and entitled "Manual Transmission With Torque Converter." This design places the torque converter in series between the clutch and the gear set of a manual transmission. However, in such designs the need for a separate clutch disposed between the engine output and the torque converter remains.

SUMMARY

This section provides a general summary of the disclosure, and is not a comprehensive disclosure of its full scope or all of its features.

The present disclosure provides for a torque converter assembly that eliminates the need for a separate clutch when coupled to a manual transmission. The torque converter assembly includes a housing that rotates with the engine and a cover that abuts the housing to form an internal cavity. Many components of the torque converter assembly are contained within this internal cavity including a stator, a pump, a turbine, and an integrated disconnect clutch. The stator redirects fluid flow within the internal cavity in order to multiply engine torque. The pump circulates (i.e. pumps) fluid within the internal cavity and the turbine is driven by this fluid flow. Accordingly, a fluid coupling is defined between the pump and the turbine. The integrated disconnect clutch selectively engages the housing such that a friction coupling is created between the housing and the integrated disconnect clutch when the integrated disconnect clutch is engaged. The torque converter assembly further includes a first output shaft and a second output shaft. The first output shaft is rotatably coupled to the turbine and drives the first forward gear and optionally the reverse gear of the manual transmission via the fluid coupling between the pump and the turbine. The second output shaft is rotatably coupled to the integrated disconnect clutch. In this way, the second output shaft drives one of the other forward gears of the manual transmission via the friction coupling between the housing and the integrated disconnect clutch.

In accordance with another aspect of the present disclosure, an output connection member may be provided. The output connection member is disposed within the internal cavity and rotatably couples the pump to the integrated disconnect clutch and/or the second output shaft.

In accordance with yet another aspect of the subject disclosure, a method of controlling the torque converter assembly and the manual transmission described above is provided. The method includes the steps of: rotating the housing of the torque converter assembly using the engine, providing the fluid coupling between the pump and the turbine of the torque converter assembly, and transferring torque from the housing of the torque converter assembly to the pump. As a result, the pump is rotationally driven and generates fluid flow within an internal cavity of the torque converter assembly. Because the output connection member rotatably couples the pump to the integrated disconnect clutch, torque is transferred from the housing, to the integrated disconnect clutch, and from the integrated disconnect clutch to the pump. The method further includes the steps of: driving rotation of the turbine of the torque converter assembly with the fluid flow generated by the pump, using the turbine to rotate the first output shaft, and engaging the first forward gear of the manual transmission during vehicle launch such that the first forward gear rotates with the first output shaft and is driven by the fluid coupling between the pump and the turbine. Because the first output shaft is driven by the fluid coupling between the turbine and the pump, the first output shaft is permitted to slip relative to the pump. The method also includes the steps of: providing a friction coupling between the housing and an integrated disconnect clutch of the torque converter assembly, transferring torque from the housing to the integrated disconnect clutch to drive rotation of the integrated disconnect clutch, using the integrated disconnect clutch to rotate the second output shaft, and engaging the second forward gear of the manual transmission after vehicle launch such that the second forward gear rotates with the second output shaft and is driven by the friction coupling between the housing and the integrated disconnect clutch. Because the second output shaft is driven by the friction coupling between the housing and the integrated disconnect clutch, slip between the second output shaft and the housing is limited.

Advantageously, the torque converter assembly and method set forth herein eliminate the need for a separate clutch disposed between an engine and a manual transmission. Because the fluid coupling between the pump and the turbine is used to provide slip when the first forward gear is engaged, vehicle launch can occur without the aid of a separate clutch. By eliminating the clutch of a conventional manual transmission, packaging and mass reduction benefits are realized. Specifically, the axial distance between the engine output and the manual transmission can be reduced by eliminating the clutch of a conventional manual transmission. Efficiency also improves by eliminating the rotational inertia and friction losses associated with the clutch of a conventional manual transmission. The simplicity of the disclosed design also improves reliability as the clutch of a conventional manual transmission is a wear part that must be replaced at regular mileage intervals. Accordingly, the maintenance costs associated with the disclosed design are less than those associated with conventional manual transmissions. The disclosed design is beneficial in that it offers improved efficiency and cost over conventional automatic transmissions due to its greater simplicity and because the integrated disconnect clutch bypasses the fluid coupling between the pump and the turbine when one of the other forward gears of the manual transmission is engaged. The disclosed design also offers improved refinement and ease of use when compared to conventional manual transmissions due to the torque multiplication function of the torque converter assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
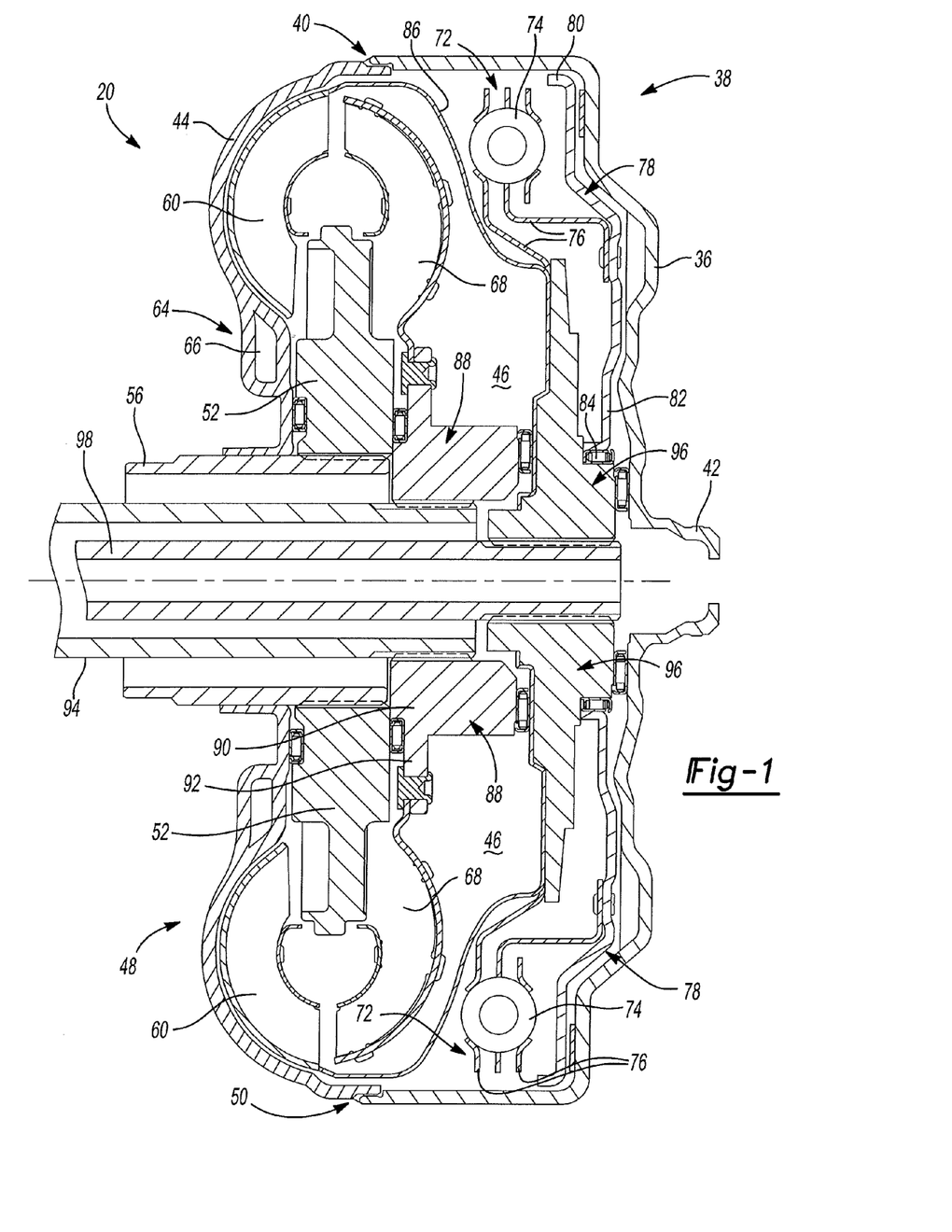
FIG. 1 is a cross-sectional view of an exemplary torque converter assembly constructed in accordance with the present disclosure.
Figure 2:
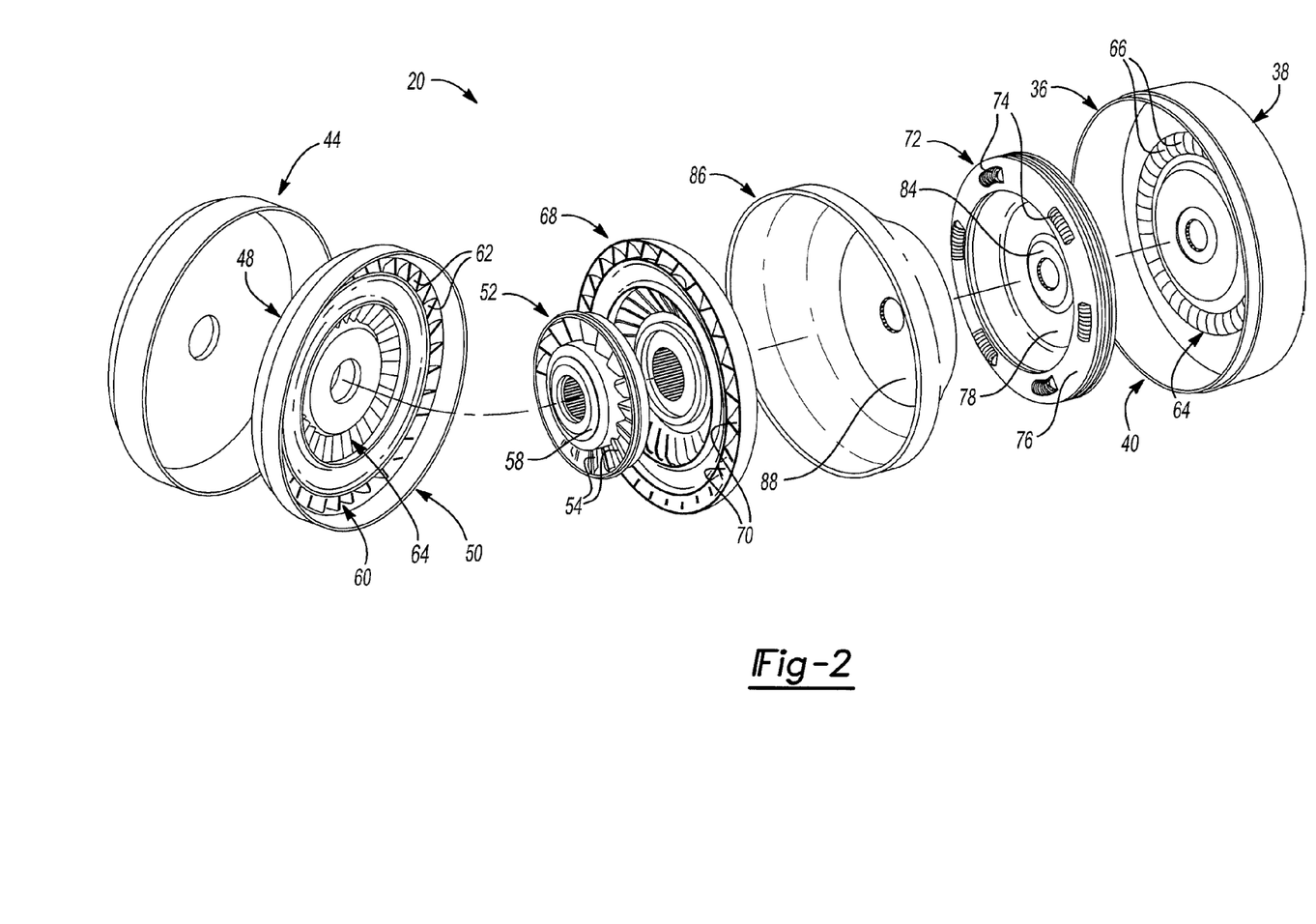
FIG. 2 is an exploded view of the exemplary torque converter assembly shown in FIG. 1.
Figure 3:
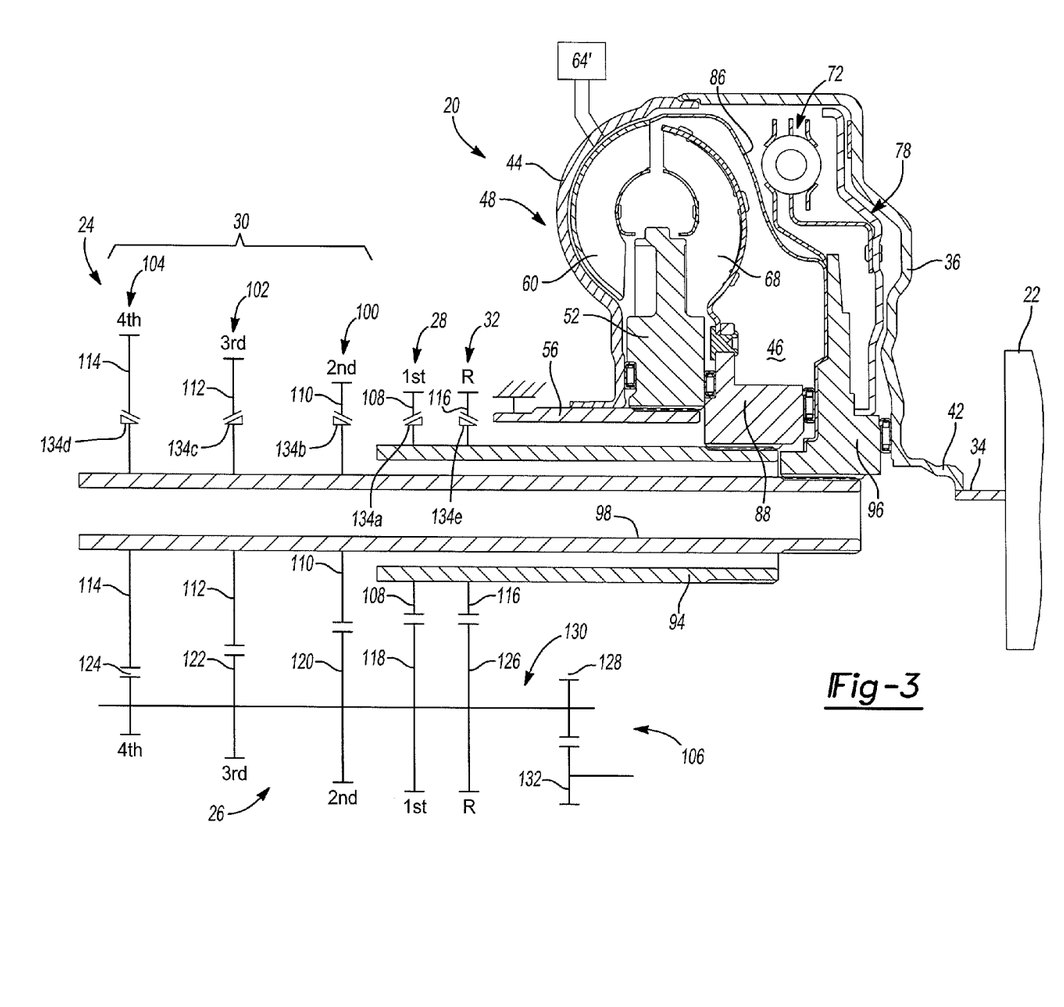
FIG. 3 is a schematic diagram illustrating an exemplary manual transmission including the exemplary torque converter assembly of the present disclosure.

Referring to FIGS. 1-3, wherein like numerals indicate corresponding parts throughout the several views, a torque converter assembly 20 for coupling an engine 22 to a manual transmission 24 is provided. The manual transmission 24 may generally have a gear set 26 including a first forward gear 28 and at least one other forward gear 30. The gear set 26 of the manual transmission 24 may also include a reverse gear 32. The engine 22 may have an engine output 34 (e.g., a crankshaft) that couples with the torque converter assembly 20. The engine 22 may be, without limitation, a spark ignition engine (e.g., gasoline engine), a compression ignition engine (e.g., diesel engine), or an electric motor. It should be appreciated that the term "engine" as used herein refers to any prime mover capable of producing rotational motion. This rotational motion is imparted to the engine output 34. As such, the engine may be utilized in an automobile for example, but other applications are envisioned and are within the scope of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1-3, the torque converter assembly 20 of the present disclosure includes a housing 36 that rotates with the engine 22 and more particularly with the engine output 34. While the geometry of the housing 36 may vary, the housing 36 may be generally cylindrical in shape with a closed end 38 adjacent the engine output 34 and an open end 40 opposite the closed end 38 of the housing 36. The open end 40 of the housing 36 generally faces away from the engine 22.

An alignment coupling 42 is connected to the closed end 38 of the housing 36 and aligns the housing 36 of the torque converter assembly 20 with the engine output 34. When the housing 36 is properly aligned with the engine output 34, the housing 36 is bolted to the engine output 34. Torque from the engine 22 is thus transferred from the engine output 34 to the housing 36 through this bolted connection. The torque converter assembly 20 also includes a cover 44 that abuts the housing 36 to form an internal cavity 46. While the geometry of the cover 44 may vary, the cover 44 may have a bell-like shape with a closed end 48 adjacent the manual transmission 24 and an open end 50 opposite the closed end 48 of the cover 44. The housing 36 and the cover 44 may abut one another in partial overlapping engagement such that the open end 40 of the housing 36 mates with the open end 50 of the cover 44. Together the housing 36 and the cover 44 form the exterior packaging of the torque converter assembly 20 and the internal cavity 46 that is formed by the housing 36 and the cover 44 may generally have a toroidal shape. In use, the internal cavity 46 of the torque converter assembly 20 is at least partially filled with a fluid that functions to transmit torque from the engine output 34 to the manual transmission 24. The fluid may also act as lubricant that reduces wear and friction. It should also be appreciated that when in use, the housing 36 and the cover 44 rotate in the same rotational direction. The housing 36 and the cover 44 may be fixed with one another in numerous ways, including without limitation, by welding. Alternatively, the housing 36 and the cover 44 may be integral with one another.

A stator 52 is disposed within the internal cavity 46 of the torque converter assembly 20. More particularly, the stator 52 is disposed adjacent a pump 60, which is also disposed in the internal cavity 46. While the geometry of the stator 52 may vary, the stator 52 may have a disc-like shape. The stator 52 includes a plurality of vanes 54 that are radially spaced about the stator 52. The vanes 54 of the stator 52 redirect fluid flow within the internal cavity 46 to multiply torque. Generally speaking, the vanes 54 of the stator 52 are curved and angled such that the vanes 54 of the stator 52 force the fluid in the internal cavity 46 to flow in the same rotational direction as the housing 36 and the pump 60. The vanes 54 of the stator 52 also force the fluid in the internal cavity 46 in an axial direction moving from the housing 36 and toward the pump 60. This flow reversal of the fluid in the housing 36 multiplies the amount of torque that the torque converter assembly 20 can transfer to the manual transmission 24. The amount of torque multiplication varies with the amount of slippage within the torque converter assembly 20. The higher the slippage, the greater the torque multiplication produced by the stator 52. Slippage is high where there is a large difference between the rotational speed of the engine output 34 and the rotational speed of the manual transmission 24. For example, high slippage occurs where a vehicle is stationary in an in-gear stop. This condition is called stall, where the drivetrain is not rotating but where the engine 22 is rotating at idle speed. High slippage also occurs during acceleration. Generally speaking, the amount of torque multiplication of the torque converter assembly 20 is highly dependent upon the size and geometry of the vanes 54 of the stator 52. There is also typically a trade-off between maximum torque multiplication and efficiency.

The stator 52 of the torque converter assembly 20 is connected to a stator shaft 56. The stator shaft 56, which is rotatably coupled to the stator 52, extends through the cover 44 for coupling with the manual transmission 24. More particularly, the stator shaft 56 may be fixed to the manual transmission 24 such that it cannot rotate in any direction. As such, the stator 52 may be rotationally fixed in place on the stator shaft 56 (FIG. 1). Alternatively, the stator 52 may be supported on the stator shaft 56 by a one-way stator clutch 58 (FIG. 2). The one-way stator clutch 58 is disposed within the housing 36 and supports the stator 52 on the stator shaft 56. More particularly, the one-way stator clutch 58 may be disposed annularly about the stator shaft 56 between the stator 52 and the stator shaft 56. The one-way stator clutch 58 acts as an overrunning clutch where the stator 52 is free to rotate in the same direction as the housing 36 and the cover 44, but is prevented from counter-rotation with respect to the housing 36 and the cover 44. In use, the stator 52 typically does not rotate when the vehicle is stationary and in-gear or when the vehicle is accelerating; however, the stator 52 will begin to rotate in the same direction as the housing 36 and the cover 44 once slippage is reduced and there is little difference between the rotational speed of the engine output 34 and the manual transmission 24.

The pump 60 of the torque converter assembly 20 also includes a plurality of vanes 62 that are fixed to the pump 60. The pump 60 rotates with respect to the cover 44 and the vanes 62 of the pump 60 circulate or pump the fluid within the internal cavity 46 as the pump 60 rotates. Stated another way, the pump 60 causes the fluid within the internal cavity 46 to circulate, rotate, or swirl in the same rotational direction as the pump 60 and to flow in the axial direction from the pump 60 back toward a turbine 68, which is also disposed within the internal cavity 46. It should be appreciated that while different geometries of the pump 60 are envisioned, at least a portion of the pump 60 may be disposed radially outwardly of the stator 52. In this way, the fluid flows in the axial direction from the housing 36 to the cover 44 by passing through the stator 52 and from the pump 60 back to the housing 36 by passing through a region that is radially outward of the stator 52. As shown in FIGS. 1 and 2, the torque converter assembly 20 may optionally include a charge pump 64 disposed within the internal cavity 46. As shown in FIG. 1, the charge pump 64 may include at least one vane 66 positioned between the cover 44 and the stator 52. As shown in FIG. 3, the charge pump 64' may alternatively be external to the internal cavity 46 that is driven by the cover 44 and that is connected in fluid communication with the internal cavity 46. Regardless of the configuration, the charge pump 64, 64' functions to provide additional fluid pressure within the internal cavity 46 as the housing 36 begins to rotate in response to start-up of the engine 22.

Referring to FIGS. 1-3, the turbine 68 of the torque converter assembly 20 is disposed within the internal cavity 46 adjacent to the pump 60 and the stator 52 and axially between the stator 52 and the housing 36. While the geometry of the turbine 68 may vary, the turbine 68 may have a disc-like shape and includes a plurality of vanes 70. The vanes 70 of the turbine 68 drive the turbine 68 in response to fluid flow within the internal cavity 46 such that a fluid coupling is defined between the pump and the turbine. At least a portion of the turbine 68 may be disposed radially outwardly of the stator 52 such that the turbine 68 receives fluid moving over the stator 52 in the axial direction from the pump 60 towards the housing 36.

A torsional damper 72 is disposed within the internal cavity 46 of the torque converter assembly 20 adjacent the housing 36. The torsional damper 72 may take a variety of forms without departing form the scope of the present disclosure. By way of example and without limitation, the torsional damper 72 may generally include one or more damper elements 74 such as a spring or an elastic material carried by one or more support plates 76. The torsional damper 72 attenuates torsional vibrations in the torque converter assembly 20. Such torsional vibrations may be transmitted to the housing 36 by the engine output 34.

An integrated disconnect clutch 78 is also disposed within the internal cavity 46 of the torque converter assembly 20. The integrated disconnect clutch 78 is rotatably coupled to the torsional damper 72, either as a separate part that is attached to the torsional damper 72 or as an integrally formed extension of the torsional damper 72. The integrated disconnect clutch 78 is disposed adjacent the housing 36 and is operable to selectively engage the housing 38 by pressing against the housing 36 when the torque converter assembly 20 is in use. Therefore, a friction coupling is created between the housing 36 and the integrated disconnect clutch 78. The integrated disconnect clutch 78 controls rotational slip of the torsional damper 72 with respect to the housing 36. More particularly, the integrated disconnect clutch 78 may include a distal portion 80 and a proximal portion 82 that is disposed radially inward of the distal portion 80. The distal portion 80 of the integrated disconnect clutch 78 is connected to the torsional damper 72 and the proximal portion 82 of the integrated disconnect clutch 78 presents an input connection 84. The torque converter assembly 20 also includes an output connection member 86 disposed within the internal cavity 46. The output connection member 86 is connected to and extends between the torsional damper 72 and the pump 60. Accordingly, the output connection member 86 rotatably couples the torsional damper 72 and the pump 60 in series with the integrated disconnect clutch 78.

The torque converter assembly 20 further includes a first output rotor 88 disposed within the internal cavity 46. The first output rotor 88 is disposed adjacent to the stator 52 and axially between the stator 52 and the housing 36. The first output rotor 88 is connected to and rotatably coupled with the turbine 68. While the geometry of the first output rotor 88 may vary, the first output rotor 88 may have a base 90 that has a cylindrical shape and a flange 92 that extends from the base 90 in the radial direction to form a disc-like shape.

A first output shaft 94 is rotatably coupled to the turbine 68 by the first output rotor 88. More specifically, the first output shaft 94 may be coupled to the base 90 of the first output rotor 88 and the flange 92 of the first output rotor 88 may be coupled to the turbine 68. The first output shaft 94 extends through the cover 44 to couple with at least the first forward gear 28 of the manual transmission 24. Where the manual transmission 24 includes a reverse gear 32, the first output shaft 94 may couple with both the first forward gear 28 and the reverse gear 32 of the manual transmission 24. Accordingly, the first output rotor 88 drives the first forward gear 28 and optionally the reverse gear 32 of the manual transmission 24 through the first output shaft 94 while permitting slip between the engine output 34 and the first forward gear 28 and the reverse gear 32 of the manual transmission 24. Such slip is permitted because the first output rotor 88 is connected to the turbine 68 of the torque converter assembly 20, which is driven by the fluid coupling between the pump 60 and the turbine 68. The fluid coupling allows the turbine 68 to rotate at a different speed than the pump 60 and, thus, the housing 36 of the torque converter assembly 20. This slip allows for easy vehicle launch in both the first forward gear 28 and the reverse gear 32 without requiring a separate clutch like those used in conventional manual transmissions because the stator 52 multiplies the engine's torque during high-slip operation. This torque multiplication function of the stator 52 prevents the engine 22 from stalling as the vehicle is launched from a stop.

The torque converter assembly 20 also includes a second output rotor 96 disposed within the internal cavity 46. The second output rotor 96 is rotatably coupled to the torsional damper 72, either as a separate part that is attached to the torsional damper 72 or as an integrally formed extension of the torsional damper 72. The second output rotor 96 is separate from the first output rotor 88 such that the second output rotor 96 can rotate independent of the first output rotor 88. The second output rotor 96 may be disposed adjacent the housing 36 and the integrated disconnect clutch 78. While the geometry of the second output rotor 96 may vary, the second output rotor 96 may have a disc-like shape that is disposed radially inward of the torsional damper 72. The second output rotor 96 is connected to the output connection member 86 of the torque converter assembly 20 and the integrated disconnect clutch 78 by at least one of the support plates 76 of the torsional damper 72 and/or the input connection 84. Accordingly, the second output rotor 96 is rotatably coupled in series with the pump 60 via the output connection member 86 and the integrated disconnect clutch 78 via the torsional damper 72 and/or the input connection 84.

A second output shaft 98 is rotatably coupled to both the output connection member 86 and the integrated disconnect clutch 78 by the second output rotor 96. The second output shaft 98 extends through the cover 44 to couple with the at least one of the other forward gears 30 of the manual transmission 24. Accordingly, the second output rotor 96 drives the at least one of the other forward gears 30 of the manual transmission 24 through the second output shaft 98 without permitting slip between the engine output 34 and the at least one other forward gear 30 of the manual transmission 24. Such slip can be prevented because the integrated disconnect clutch 78 can press against or engage the housing 36, which is coupled to the engine output 34, to rotatably couple the second output rotor 96 with the housing 36. Therefore, the friction coupling between the housing 36 and the integrated disconnect clutch 78 allows for greater efficiency when cruising in one of the other forward gears 30 because the manual transmission 24 is rotatably coupled or locked with the housing 36 of the torque converter assembly 20, and thus the engine output 34.

While the relationships between the first output shaft 94, the second output shaft 98, and the stator shaft 56 may vary, the first output shaft 94 and the second output shaft 98 may be co-axially arranged with each other and the stator shaft 56. By way of example and without limitation, the second output shaft 98 may be co-axially arranged within the first output shaft 94 and the first output shaft 94 may be co-axially arranged within the stator shaft 56. In other words, the stator shaft 56 may be disposed on the outside of the first output shaft 94 such that the first output shaft 94 is arranged in between the stator shaft 56 and the second output shaft 98.

With particular reference to FIG. 3, the disclosed torque converter assembly 20 is shown coupled to the manual transmission 24 and the manual transmission 24 is shown coupled to a final drive assembly 106. The manual transmission 24 may take many forms and may include a variety of different gear ratios. By way of example and without limitation, the manual transmission 24 illustrated in FIG. 3 has a gear set 26 that includes the first forward gear 28, at least one other forward gear 30, and the reverse gear 32. More particularly, the at least one other forward gear 30 includes a second forward gear 100, a third forward gear 102, and a fourth forward gear 104. Accordingly, the manual transmission 24 illustrated in FIG. 3 may commonly be referred to as a four-speed manual transmission. Each of the first forward gear 28, the second forward gear 100, the third forward gear 102, the fourth forward gear 104 actually includes at least an input gear and an output gear. The input gears 108, 110, 112, 114, 116 of the manual transmission 24 are carried (i.e. supported) on either the first output shaft 94 or the second output shaft 98 and may be rotatably coupled to (i.e. engaged for rotation with) either the first output shaft 94 or the second output shaft 98 of the torque converter assembly 20 through synchronisers 134a-e and/or disconnect dog clutches (not shown). Again, the stator shaft 56 of the torque converter assembly 20 is fixed to the manual transmission 24 and does not rotate. The output gears 118, 120, 122, 124, 126 of the manual transmission 24 are disposed in meshing engagement with the input gears 108, 110, 112, 114, 116 and are rotatably coupled to a transmission output shaft 130.

The first forward gear 28 includes first input gear 108 and first output gear 118. The first input gear 108 is rotatably coupled to the first output shaft 94 through one of the synchronizers 134a. The first output gear 118 is disposed in meshing engagement with the first input gear 108 and is rotatably coupled to the transmission output shaft 130. The second forward gear 100 includes second input gear 110 and second output gear 120. The second input gear 110 is rotatably coupled to the second output shaft 98 through another one of the synchronizers 134b. The second output gear 120 is disposed in meshing engagement with the second input gear 110 and is rotatably coupled to the transmission output shaft 130. The third forward gear 102 includes third input gear 112 and third output gear 122. The third input gear 112 is rotatably coupled to the second output shaft 98 through another one of the synchronizers 134c. The third output gear 122 is disposed in meshing engagement with the third input gear 112 and is rotatably coupled to the transmission output shaft 130. The fourth forward gear 104 includes fourth input gear 114 and fourth output gear 124. The fourth input gear 114 is rotatably coupled to the second output shaft 98 through another one of the synchronizers 134d. The fourth output gear 124 is disposed in meshing engagement with the fourth input gear 114 and is rotatably coupled to the transmission output shaft 130. The reverse gear 32 includes reverse input gear 116 and reverse output gear 126. The reverse input gear 116 is rotatably coupled to the first output shaft 94 through another one of the synchronizers 134e. The reverse output gear 126 is disposed in meshing engagement with the reverse input gear 116 and is rotatably coupled to the transmission output shaft 130. The final drive assembly 106 includes a pinion output gear 128 and a final drive gear 132 disposed in meshing engagement with the pinion output gear 128. By way of example and without limitation, the final drive assembly 106 may be a differential that is ultimately coupled to the drive wheels of a vehicle.

Thus, it should be appreciated that by eliminating the separate clutch of conventional manual transmissions, the disclosed torque converter assembly 20 reduces the packaging size and mass of the drivetrain. Specifically, the axial distance between the engine output 34 and the manual transmission 24 can be reduced. Efficiency is also improved because the rotational inertia and friction losses associated with the separate clutch of conventional manual transmissions are eliminated. Further, the simplicity of the disclosed design improves reliability and decreases maintenance costs because the need to replace separate the separate clutch of conventional manual transmissions at regular mileage intervals is eliminated. Further, the disclosed design offers improved efficiency and cost over conventional automatic transmissions due to its greater simplicity. The disclosed design also offers improved refinement and ease of use when compared to conventional manual transmissions due to the torque multiplication function provided by the stator 52 of the torque converter assembly 20. Additionally, because the separate clutch of conventional manual transmissions is eliminated, gear changes can be accomplished without requiring the driver to engage and release the clutch while adjusting clutch pressure and engine speed.

The integrated disconnect clutch 78 of the disclosed torque converter assembly 20 may be actuated in one of several ways. The integrated disconnect clutch 78 may be manually actuated in a similar fashion to the separate clutch of conventional manual transmissions. However, due to the slip permitted by the torque converter assembly 20 and the torque multiplication function of the stator 52, it is not necessary to carefully balance engine speed, shift timing, and clutch pressure need not be carefully balanced as is the case with the separate clutch of conventional manual transmissions. This results in easier operation and smoother gear changes. Alternatively, the integrated disconnect clutch 78 can be autonomously actuated requiring no driver input. By way of example and without limitation, the integrated disconnect clutch 78 in such a configuration may be automatically actuated by hydraulic, mechanical, electric, electromechanical, and pneumatic actuators (not shown). As such, the driver merely selects a gear and the gear change occurs without driver operation of the integrated disconnect clutch 78.

In operation, the engine 22 rotationally drives the housing 36 at the same rotational speed as the engine 22. The vanes 66 of the charge pump 64 thus pump the fluid within the internal cavity 46, which travels from the housing 36 toward the cover 44. The pump 60 is at least partially driven by this fluid flow. The pump 60 may also be driven by the output connection member 86 of the second output rotor 96 when the integrated disconnect clutch 78 is engaged. In the engaged state, the integrated disconnect clutch 78 is pressed against the housing 36 (creating the friction coupling) and thus rotates with the housing 36. The integrated disconnect clutch 78 is rotatably coupled to the second output rotor 96 via the support plates 76 of the torsional damper 72 and/or the input connection 84. Accordingly, integrated disconnect clutch 78, the second output rotor 96, the output connection member 86, and the pump 60 all rotate with the housing 36 without any slip when the integrated disconnect clutch 78 is fully engaged. The second output shaft 98 is rotatably coupled to the second output rotor 96 and may rotatably drive any one of the second forward gear 100, the third forward gear 102, and the fourth forward gear 104 when the integrated disconnect clutch 78 is fully engaged. Because the integrated disconnect clutch 78 forms the frictional coupling with the housing 36, thereby locking rotation of the second output rotor 96 with the housing 36, the second forward gear 100, the third forward gear 102, and the fourth forward gear 104 may be driven without any slip.

As the pump 60 rotates in response to fluid flow within the internal cavity 46 and/or in response being driven by the output connection member 86, the vanes of the pump 62 pump fluid from the cover 44 to the turbine 68. This rotatably drives the turbine 68 via the fluid coupling. The turbine 68 is rotatably coupled to the first output rotor 88 such that the first output rotor 88 rotates with and is driven by the turbine 68. The first output shaft 94 is rotatably coupled to the first output rotor 88 and may rotatably drive one of the first forward gear 28 and the reverse gear 32 in response to rotation of the pump 60. Because the first output rotor 88 is driven by the fluid coupling between the pump 60 and the turbine 68, the first forward gear 28 and the reverse gear 32 may be driven with slip. When such slip occurs, fluid flow from the turbine 68 passes through the stator 52 before traveling back to the pump 60. The vanes of the stator 54 reverse the fluid flow coming from the turbine 68 such that the pump 60 can increase output, thus multiplying the torque transmitted to the turbine 68 and the first output rotor 88. In this way, a vehicle can be launched from a stop when the first forward gear 28 or the reverse gear 32 is selected without the separate clutch of conventional manual transmissions and without stalling the engine 22.

As such, a method of controlling the torque converter assembly 20 and the manual transmission 24 described above is also provided. The method includes the steps of: rotating the housing 36 of the torque converter assembly 20 using the engine 22, providing the fluid coupling between the pump 60 and the turbine 68 of the torque converter assembly 20, and transferring torque from the housing 36 of the torque converter assembly 20 to the pump 60. As a result of the step of transferring torque from the housing 36 to the pump 60, the pump 60 is rotationally driven and generates fluid flow within the internal cavity 46 of the torque converter assembly 20. It should also be appreciated that while torque transfer between the housing 36 and the pump 60 may be accomplished in several ways, the step of transferring torque from the housing 36 to the pump 60 may include engaging the integrated disconnect clutch 78 to transfer torque from the housing 36 to the pump 60 via the output connection member 86. As noted above, the output connection member 86 rotatably couples the pump 60 to the integrated disconnect clutch 78. Therefore, the output connection member 86 provides a path through which torque can be transferred, where torque is transferred from the housing 36, to the integrated disconnect clutch 78, and from the integrated disconnect clutch 78 to the pump 60.

The method further includes the steps of: driving rotation of the turbine 68 of the torque converter assembly 20 with the fluid flow generated by the pump 60, using the turbine 68 to rotate the first output shaft 94, and engaging the first forward gear 28 of the manual transmission 24 during vehicle launch such that the first forward gear 28 rotates with the first output shaft 94 and is driven by the fluid coupling between the pump 60 and the turbine 68. As described above, the first output shaft 94 carries the first forward gear 28 of the manual transmission 24. Because the first output shaft 94 is driven by the fluid coupling between the turbine 68 and the pump 60, the first output shaft 94 and thus the first forward gear 28 are permitted to slip relative to the pump 60. This is advantageous when the first forward gear 28 is engaged because the permitted slip prevents the engine 22 from stalling during vehicle launches and provides smoother acceleration from a standing start. In addition, the method may provide the step of using the stator 52 of the torque converter assembly 20 to re-direct the fluid flow generated by the pump 60 to multiply the torque at the turbine 68 that is applied by the fluid flow. The ability of the stator 52 to multiply the torque at the turbine 68 in accordance with this step is dependent upon slip between the turbine 68 (and thus the first output shaft 94) and the pump 60.

The method also includes the steps of: providing a friction coupling between the housing 36 and the integrated disconnect clutch 78 of the torque converter assembly 20, transferring torque from the housing 36 to the integrated disconnect clutch 78 to drive rotation of the integrated disconnect clutch 78, using the integrated disconnect clutch 78 to rotate the second output shaft 98, and engaging the second forward gear 100 of the manual transmission 24 after vehicle launch such that the second forward gear 100 rotates with the second output shaft 98 and is driven by the friction coupling between the housing 36 and the integrated disconnect clutch 78. As described above, the second output shaft 98 carries the second forward gear 100 of the manual transmission 24. Because the second output shaft 98 is driven by the friction coupling between the housing 36 and the integrated disconnect clutch 78, slip between the second output shaft 98 (and thus the second forward gear 100) and the housing 36 is limited. Although torque transfer between the housing 36 and the integrated disconnect clutch 78 may be accomplished in several ways, the step of transferring torque from the housing 36 to the integrated disconnect clutch 78 to drive rotation of the integrated disconnect clutch 78 may be performed by pressing the integrated disconnect clutch 78 against the housing 36 until slip is eliminated between the integrated disconnect clutch 78 and the housing 36. This is advantageous when the second forward gear 100 (or any one of the other forward gears 30) is engaged because engine stall is not as much of a concern after vehicle launch has occurred and any slip occurring in the torque converter assembly 20 results in inefficiencies when the second forward gear 100 (or any one of the other forward gears 30) is engaged. In other words, the method set forth herein utilizes the fluid coupling between the pump 60 and the turbine 68 when the first forward gear 28 (or the reverse gear 32) is engaged and bypasses the fluid coupling between the pump 60 and the turbine 68 when the second forward gear 100 (or any one of the other forward gears 30) is engaged.

The foregoing description of the embodiments has been provided for the purposes of illustration and description. It is not intended to be exhaustive or limiting. Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. Additionally, the order of the step in the method set forth herein is not meant to be limiting. It should be appreciated that the steps of the method may be performed in a different order than that described herein without departing from the scope of the subject disclosure.

What is claimed is:

1. A torque converter assembly for coupling an engine to a transmission, said torque converter assembly comprising:
    a housing configured to be driven by the engine;
    a cover abutting said housing to form an internal cavity with said housing;
    a stator disposed within said internal cavity including a plurality of vanes for redirecting fluid flow within said internal cavity to multiply torque;
    a pump disposed within said internal cavity including a plurality of vanes that are configured to rotate relative to said cover and pump fluid within said internal cavity;
    a turbine disposed within said internal cavity including a plurality of vanes that are configured to drive said turbine in response to the fluid flow within said internal cavity such that a fluid coupling is defined between said pump and said turbine;
    an integrated disconnect clutch disposed within said internal cavity that selectively engages said housing for rotation therewith such that a friction coupling is created between said housing and said integrated disconnect clutch when said integrated disconnect clutch is engaged;
    a first output shaft rotatably coupled to said turbine by a first output rotor that extends between and is connected to said first output shaft and said turbine for driving the transmission via said fluid coupling between said pump and said turbine; and
    a second output shaft that is driven independent of said first output shaft and said turbine and that is rotatably coupled to said integrated disconnect clutch by a second output rotor, wherein said second output rotor is rotatably coupled to an output connection member that extends between and is directly connected to said second output rotor and said pump for driving the transmission via said friction coupling between said housing and said integrated disconnect clutch.

2. The torque converter assembly as set forth in claim 1 further comprising:
    a torsional damper disposed within said internal cavity that is rotatably coupled to said second output rotor for attenuating torsional vibration transmitted to said housing by the engine.

3. The torque converter assembly as set forth in claim 2 wherein said torsional damper includes support plates connected to said integrated disconnect clutch and said second output rotor, said support plates rotatably coupling said integrated disconnect clutch to said second output rotor.

4. The torque converter assembly as set forth in claim 1 wherein said integrated disconnect clutch engages said housing and controls rotational slip of said pump relative to said housing by pressing against said housing to transfer rotational forces from said housing, through said integrated disconnect clutch, through the second output rotor, through said output connection member, and to said pump.

5. The torque converter assembly as set forth in claim 1 wherein said friction coupling between said housing and said integrated disconnect clutch drives rotation of said pump.

6. The torque converter assembly as set forth in claim 1 wherein said second output rotor is free to rotate independently of said first output rotor.

7. The torque converter assembly as set forth in claim 1 wherein said first output shaft and said second output shaft are co-axially arranged with each other.

8. The torque converter assembly as set forth in claim 7 further comprising:
    a stator shaft rotatably coupled to said stator that is co-axially arranged with both the first output shaft and the second output shaft.

9. The torque converter assembly as set forth in claim 1 further comprising:
    a charge pump disposed within said internal cavity including at least one vane positioned between said cover and said stator that provides additional fluid pressure as said cover begins to rotate in response to start-up of the engine, wherein said at least one vane of said charge pump is fixed to and rotates with said cover.

10. The torque converter assembly as set forth in claim 1 further comprising:
    a charge pump that is external to said internal cavity, said charge pump being connected in fluid communication with said internal cavity and being driven by said cover to provide additional fluid pressure in said internal cavity as said cover begins to rotate in response to start-up of the engine.

11. A manual transmission for coupling with an engine comprising:
    a gear set including a first forward gear and at least one other forward gear;
    a torque converter assembly rotatably coupled to said gear set and the engine;
    said torque converter assembly including a housing configured to be driven by the engine and a cover that abuts said housing to form an internal cavity;
    a stator disposed within said internal cavity including a plurality of vanes for redirecting fluid flow within said internal cavity to multiply torque;
    a pump disposed within said internal cavity including a plurality of vanes that are configured to rotate relative to said cover and pump fluid within said internal cavity;
    a turbine disposed within said internal cavity including a plurality of vanes that are configured to drive said turbine in response to the fluid flow within said internal cavity such that a fluid coupling is defined between said pump and said turbine;

an integrated disconnect clutch disposed within said internal cavity that selectively engages said housing for rotation therewith such that a friction coupling is created between said housing and said integrated disconnect clutch when said integrated disconnect clutch is engaged;

a first output shaft carrying said first forward gear of said gear set, said first output shaft being rotatably coupled to said turbine by a first output rotor that extends between and is connected to said first output shaft and said turbine for driving said first forward gear via said fluid coupling between said pump and said turbine, said fluid coupling permitting slip between said housing and said first output shaft; and a second output shaft carrying said at least one other forward gear of said gear set, said second output shaft being driven independent of said first output shaft and said turbine, said second output shaft being rotatably coupled to said integrated disconnect clutch by a second output rotor, wherein said second output rotor is rotatably coupled to an output connection member that extends between and is directly connected to said second output rotor and said pump for driving said at least one other forward gear via said friction coupling between said housing and said integrated disconnect clutch, said friction coupling limiting slip between said housing and said second output shaft.

12. The manual transmission as set forth in claim 11 further comprising:

a torsional damper disposed within said internal cavity that is rotatably coupled to said second output rotor for attenuating torsional vibration transmitted to said housing by the engine.

13. The manual transmission as set forth in claim 12 wherein said torsional damper includes support plates connected to said integrated disconnect clutch and said second output rotor, said support plates rotatably coupling said integrated disconnect clutch to said second output rotor.

14. The manual transmission as set forth in claim 11 wherein said integrated disconnect clutch engages said housing and controls rotational slip of said pump relative to said housing by pressing against said housing to transfer rotational forces from said housing, through said integrated disconnect clutch, through the second output rotor, through said output connection member, and to said pump.

15. The manual transmission as set forth in claim 11 wherein said friction coupling between said housing and said integrated disconnect clutch drives rotation of said pump.

16. The manual transmission as set forth in claim 11 wherein said second output rotor is free to rotate independently of said first output rotor.

17. The manual transmission as set forth in claim 11 wherein said first output shaft and said second output shaft are co-axially arranged with each other.

18. The manual transmission as set forth in claim 11 wherein said gear set further includes a reverse gear that is carried on said first output shaft.

19. The manual transmission as set forth in claim 11 wherein said friction coupling eliminates slip between said housing and said second output shaft.

* * * * *